(12) United States Patent
Allen et al.

(10) Patent No.: US 10,176,175 B2
(45) Date of Patent: Jan. 8, 2019

(54) SYSTEM AND METHOD FOR IDENTIFYING CANDIDATES FOR BACK-OF-BOOK INDEX

(71) Applicant: INTERNATIONAL BUSINESS MACHINES CORPORATION, Armonk, NY (US)

(72) Inventors: Corville O. Allen, Morrisville, NC (US); Donna K. Byron, Petersham, MA (US); Carmine M. DiMascio, Littleton, MA (US); Florian Pinel, New York, NY (US); Timothy P. Winkler, Clinton, MA (US)

(73) Assignee: International Business Machines Corporation, Armonk, NY (US)

( * ) Notice: Subject to any disclaimer, the term of this patent is extended or adjusted under 35 U.S.C. 154(b) by 619 days.

(21) Appl. No.: 14/830,044

(22) Filed: Aug. 19, 2015

(65) Prior Publication Data

US 2017/0052987 A1    Feb. 23, 2017

(51) Int. Cl.
| | | |
|---|---|---|
| *G06F 17/30* | (2006.01) | |
| *G06K 9/00* | (2006.01) | |
| *G06F 17/27* | (2006.01) | |
| *G06F 17/22* | (2006.01) | |

(52) U.S. Cl.
CPC .... *G06F 17/30011* (2013.01); *G06F 17/2241* (2013.01); *G06F 17/277* (2013.01); *G06F 17/2715* (2013.01); *G06F 17/2735* (2013.01); *G06F 17/30616* (2013.01); *G06K 9/00469* (2013.01)

(58) Field of Classification Search
CPC ......... G06F 17/30321; G06F 17/30094; G06F 17/30312; G06F 17/30613; G06F 17/30946; G06F 17/30067; G06F 17/30619

USPC .................................................. 707/741, 711
See application file for complete search history.

(56) References Cited

U.S. PATENT DOCUMENTS

| | | | |
|---|---|---|---|
| 8,346,534 B2 | 1/2013 | Csomai et al. | |
| 9,690,850 B2* | 6/2017 | Radcliffe | ............. G06F 17/277 |
| | | | 707/707 |
| 9,805,021 B2* | 10/2017 | Radcliffe | ............ G06F 17/2705 |
| | | | 707/707 |

(Continued)

FOREIGN PATENT DOCUMENTS

| | | | |
|---|---|---|---|
| CN | 103064969 A | 4/2013 | |
| EP | 2701087 A1 * | 2/2014 | ............. G06F 17/30 |
| EP | 2701087 A1 | 2/2014 | |

OTHER PUBLICATIONS

Andras Csomai and Rada Mihalcea, "Linguistically Motivated Features for Enhanced Back of the Book Indexing," Proceedings of ACL-08, pp. 932-940.*

(Continued)

*Primary Examiner* — Alexandria Y Bromell
(74) *Attorney, Agent, or Firm* — Brian J. Colandreo, Esq.; Jeffrey T. Placker, Esq.; Holland & Knight LLP (57) ABSTRACT

A method, computer program product, and computer system for analyzing one or more existing book indexes to build a statistical model of term-to-text pairs. A document may be analyzed, wherein the document may include at least a portion of an instruction in a book. A term in the document may be identified. Whether the term is a candidate for an index of the book may be identified based upon, at least in part, the statistical model of term-to-text pairs.

14 Claims, 5 Drawing Sheets

(56) References Cited

U.S. PATENT DOCUMENTS

| | | | |
|---|---|---|---|
| 2007/0116359 A1 | 5/2007 | Ohk | |
| 2007/0168331 A1* | 7/2007 | Reddy | G06F 17/30867 |
| 2010/0057804 A1* | 3/2010 | Nakano | G06F 17/10 |
| | | | 707/737 |
| 2010/0106728 A1* | 4/2010 | Waldo | G06F 17/30011 |
| | | | 707/741 |
| 2012/0290557 A1* | 11/2012 | Reddy | G06F 17/30551 |
| | | | 707/711 |
| 2012/0303629 A1* | 11/2012 | Klein | G06F 9/453 |
| | | | 707/741 |
| 2013/0166471 A1* | 6/2013 | Fukuda Kelley | G06F 17/30038 |
| | | | 705/344 |
| 2013/0346424 A1 | 12/2013 | Zhang et al. | |
| 2014/0172821 A1* | 6/2014 | Hu | G06F 17/30867 |
| | | | 707/711 |
| 2014/0214852 A1* | 7/2014 | Serebrennikov | G06F 17/30631 |
| | | | 707/741 |
| 2014/0234814 A1* | 8/2014 | Krosky | G09B 5/02 |
| | | | 434/236 |
| 2015/0339394 A1* | 11/2015 | Jinq | G06F 17/2247 |
| | | | 715/776 |
| 2015/0363473 A1* | 12/2015 | Liao | G06F 17/30554 |
| | | | 707/722 |
| 2017/0130178 A1* | 5/2017 | Mitchell | C12C 13/00 |
| | | | 707/707 |

OTHER PUBLICATIONS

Csomai, et al., "Linguistically Motivated Features for Enhanced Back-of-the-Book Indexing", Proceeding of ACL-08: HLT, pp. 932-940, Jun. 2008.

* cited by examiner

CAPONATA
402

404 This is slightly different from ratatouille because of the addition of celery, Calamata olives, and capers...

406
*2 cups cooked peeled eggplant*
*1 teaspoon coarse (kosher) salt*
*2 tablespoons olive oil*
*1 cup chopped onion*
*½ cup chopped green bell pepper*
*½ cup chopped red bell pepper*
*¾ cup chopped celery*

• • •

*½ cup chopped pitted Calamata or Greek olives*
*2 tablespoons capers, drained*

Step 1: Sprinkle the eggplant with a course salt....

Step 2: Take 2 tablespoons of the oil and heat in a large...

408 Step 3: Add the tomatoes, pepper, oregano...

SYSTEM AND METHOD FOR IDENTIFYING CANDIDATES FOR BACK-OF-BOOK INDEX

BACKGROUND

In publishing, back-of-the-book indexing may still be a largely manual process. An index, e.g., of a cookbook, may generally be described as a reverse lookup including, e.g., pairs of terms, techniques, or ingredient names mapped to text segments that may contain important usages of those terms, typically specified via page number. Given space constraints within a printed book, it may be beneficial that only the most informative pairings be listed in the index. By contrast, online indexes need not be as concerned with space constraints, and thus a virtually unlimited number of pairing entries may be maintained.

BRIEF SUMMARY OF DISCLOSURE

In one example implementation, a method, performed by one or more computing devices, may include but is not limited to analyzing, by a computing device, one or more existing book indexes to build a statistical model of term-to-text pairs. A document may be analyzed, wherein the document may include at least a portion of an instruction in a book. A term in the document may be identified. Whether the term is a candidate for an index of the book may be identified based upon, at least in part, the statistical model of term-to-text pairs.

One or more of the following example features may be included. The statistical model may include one or more positive examples and one or more negative examples. A location of the term in the document may be determined. The one or more positive examples and the one or more negative examples may be determined based upon, at least in part, the location of the term in the document. The location of the term in the document may include a title of the instruction. The location of the term in the document may include a preamble of the instruction. The term includes at least one of an ingredient, a cooking method, and a cooking style.

In another example implementation, a computing system includes a processor and a memory configured to perform operations that may include but are not limited to analyzing one or more existing book indexes to build a statistical model of term-to-text pairs. A document may be analyzed, wherein the document may include at least a portion of an instruction in a book. A term in the document may be identified. Whether the term is a candidate for an index of the book may be identified based upon, at least in part, the statistical model of term-to-text pairs.

One or more of the following example features may be included. The statistical model may include one or more positive examples and one or more negative examples. A location of the term in the document may be determined. The one or more positive examples and the one or more negative examples may be determined based upon, at least in part, the location of the term in the document. The location of the term in the document may include a title of the instruction. The location of the term in the document may include a preamble of the instruction. The term includes at least one of an ingredient, a cooking method, and a cooking style.

In another example implementation, a computer program product resides on a computer readable storage medium that has a plurality of instructions stored on it. When executed by a processor, the instructions cause the processor to perform operations that may include but are not limited to analyzing one or more existing book indexes to build a statistical model of term-to-text pairs. A document may be analyzed, wherein the document may include at least a portion of an instruction in a book. A term in the document may be identified. Whether the term is a candidate for an index of the book may be identified based upon, at least in part, the statistical model of term-to-text pairs.

One or more of the following example features may be included. The statistical model may include one or more positive examples and one or more negative examples. A location of the term in the document may be determined. The one or more positive examples and the one or more negative examples may be determined based upon, at least in part, the location of the term in the document. The location of the term in the document may include a title of the instruction. The location of the term in the document may include a preamble of the instruction. The term includes at least one of an ingredient, a cooking method, and a cooking style.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

System Overview:

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
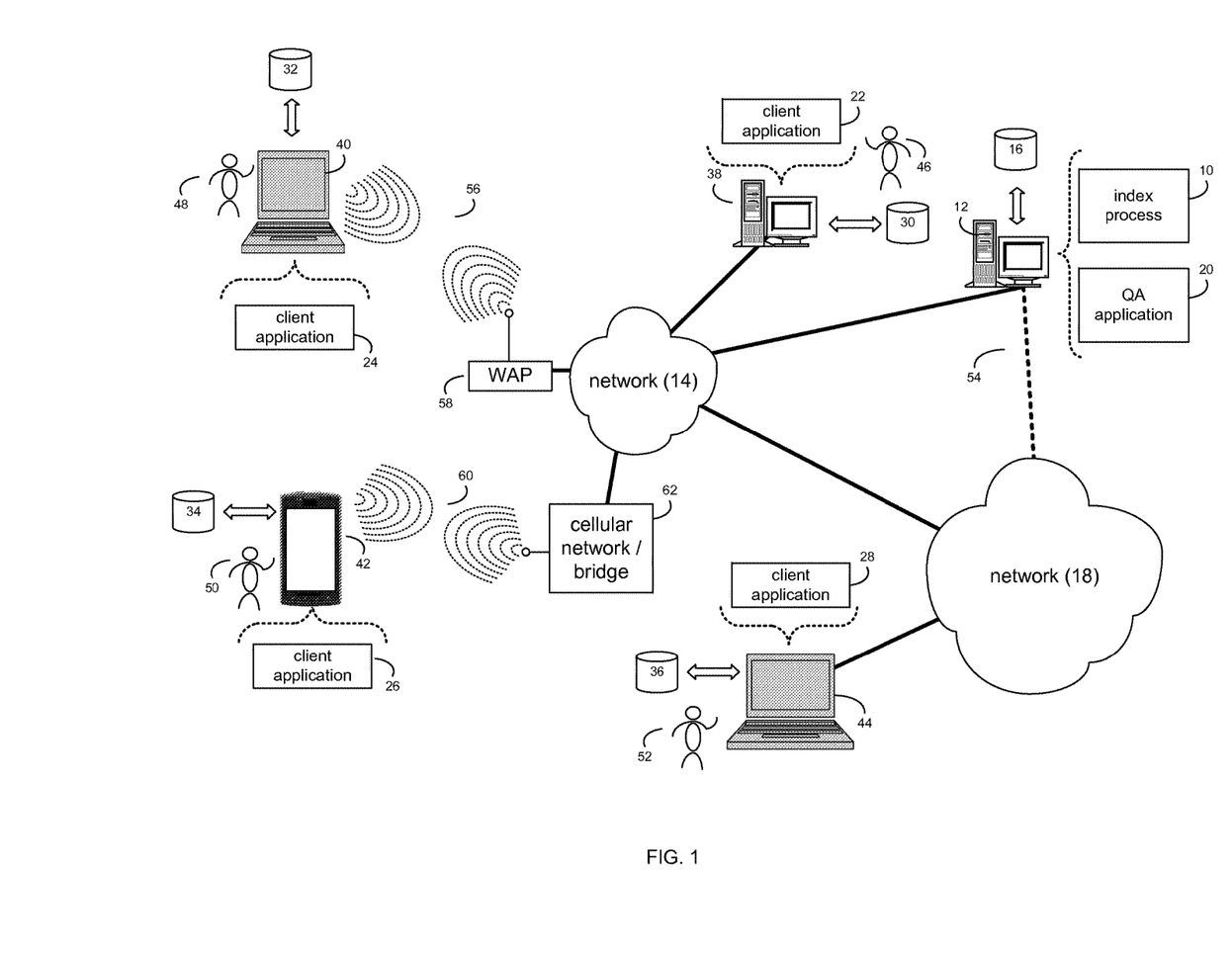
FIG. 1 is an example diagrammatic view of an index process coupled to a distributed computing network according to one or more example implementations of the disclosure.

Referring now to FIG. 1, there is shown index process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). Computer 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

As will be discussed below in greater detail, index process 10 may analyze one or more existing book indexes to build a statistical model of term-to-text pairs. A document may be analyzed, wherein the document may include at least a portion of an instruction in a book. A term in the document may be identified. Whether the term is a candidate for an index of the book may be identified based upon, at least in part, the statistical model of term-to-text pairs.

The instruction sets and subroutines of index process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Computer 12 may include a data store, such as a database (e.g., relational database, object-oriented database, triple-store database, etc.) and may be located within any suitable memory location, such as storage device 16 coupled to computer 12. Any data described throughout the present disclosure may be stored in the data store. In some implementations, computer 12 may utilize a database management system such as, but not limited to, "My Structured Query Language" (MySQL®) in order to provide multi-user access to one or more databases, such as the above noted relational database. The data store may also be a custom database, such as, for example, a flat file database or an XML database. Any other form(s) of a data storage structure and/or organization may also be used. Index process 10 may be a component of the data store, a stand alone application that interfaces with the above noted data store and/or an applet/application that is accessed via client applications 22, 24, 26, 28. The above noted data store may be, in whole or in part, distributed in a cloud computing topology. In this way, computer 12 and storage device 16 may refer to multiple devices, which may also be distributed throughout the network.

Computer 12 may execute a Question Answering (QA) system application, such as (e.g., QA application 20), examples of which may include, but are not limited to, e.g., the IBM Watson™ application (e.g., IBM Chef Watson™ application) or other QA application, a search engine application, a natural language processing (NLP) application, or other application that allows for the calculation of features for index selection. One or more aspects of IBM Chef Watson™ may be described, at least in part, for example, in "AUTOMATED GENERATION OF NEW WORK PRODUCTS AND WORK PLANS", U.S. patent application Ser. No. 13/847,099 by Pinel et al., filed on 19 Mar. 2013, and "A Big Data Approach to Computational Creativity" by L R Varshney et al., arXiv:1311.1213v1 [cs.CY], 5 Nov. 2013, the contents of which are hereby incorporated by reference herein. Index process 10 and/or QA application 20 may be accessed via client applications 22, 24, 26, 28. Index process 10 may be a stand alone application, or may be an applet/application/script/extension that may interact with and/or be executed within QA application 20, a component of QA application 20, and/or one or more of client applications 22, 24, 26, 28. QA application 20 may be a stand alone application, or may be an applet/application/script/extension that may interact with and/or be executed within index process 10, a component of index process 10, and/or one or more of client applications 22, 24, 26, 28. One or more of client applications 22, 24, 26, 28 may be a stand alone application, or may be an applet/application/script/extension that may interact with and/or be executed within and/or be a component of index process 10 and/or QA application 20. Examples of client applications 22, 24, 26, 28 may include, but are not limited to, e.g., the IBM Watson™ application (e.g., IBM Chef Watson™ application) or other QA application, a search engine application, a natural language processing (NLP) application, or other application that allows for the calculation of features for index selection, a standard and/or mobile web browser, an email client application, a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors (not shown) and one or more memory architectures (not shown) incorporated into client electronic devices 38, 40, 42, 44.

Storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet (not shown), a server (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Android™, Apple® iOS®, Mac® OS X®; Red Hat® Linux®, or a custom operating system.

One or more of client applications 22, 24, 26, 28 may be configured to effectuate some or all of the functionality of index process 10 (and vice versa). Accordingly, index process 10 may be a purely server-side application, a purely client-side application, or a hybrid server-side/client-side application that is cooperatively executed by one or more of client applications 22, 24, 26, 28 and/or index process 10.

One or more of client applications 22, 24, 26, 28 may be configured to effectuate some or all of the functionality of QA application 20 (and vice versa). Accordingly, QA application 20 may be a purely server-side application, a purely client-side application, or a hybrid server-side/client-side application that is cooperatively executed by one or more of client applications 22, 24, 26, 28 and/or QA application 20. As one or more of client applications 22, 24, 26, 28, index process 10, and QA application 20, taken singly or in any combination, may effectuate some or all of the same functionality, any description of effectuating such functionality via one or more of client applications 22, 24, 26, 28, index process 10, QA application 20, or combination thereof, and any described interaction(s) between one or more of client applications 22, 24, 26, 28, index process 10, QA application 20, or combination thereof to effectuate such functionality, should be taken as an example only and not to limit the scope of the disclosure.

Users 46, 48, 50, 52 may access computer 12 and index process 10 (e.g., using one or more of client electronic devices 38, 40, 42, 44) directly through network 14 or through secondary network 18. Further, computer 12 may be connected to network 14 through secondary network 18, as illustrated with phantom link line 54. Index process 10 may include one or more user interfaces, such as browsers and textual or graphical user interfaces, through which users 46, 48, 50, 52 may access index process 10.

The various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection.

Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, Wi-Fi®, and/or Bluetooth™ device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

Some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

Figure 2:
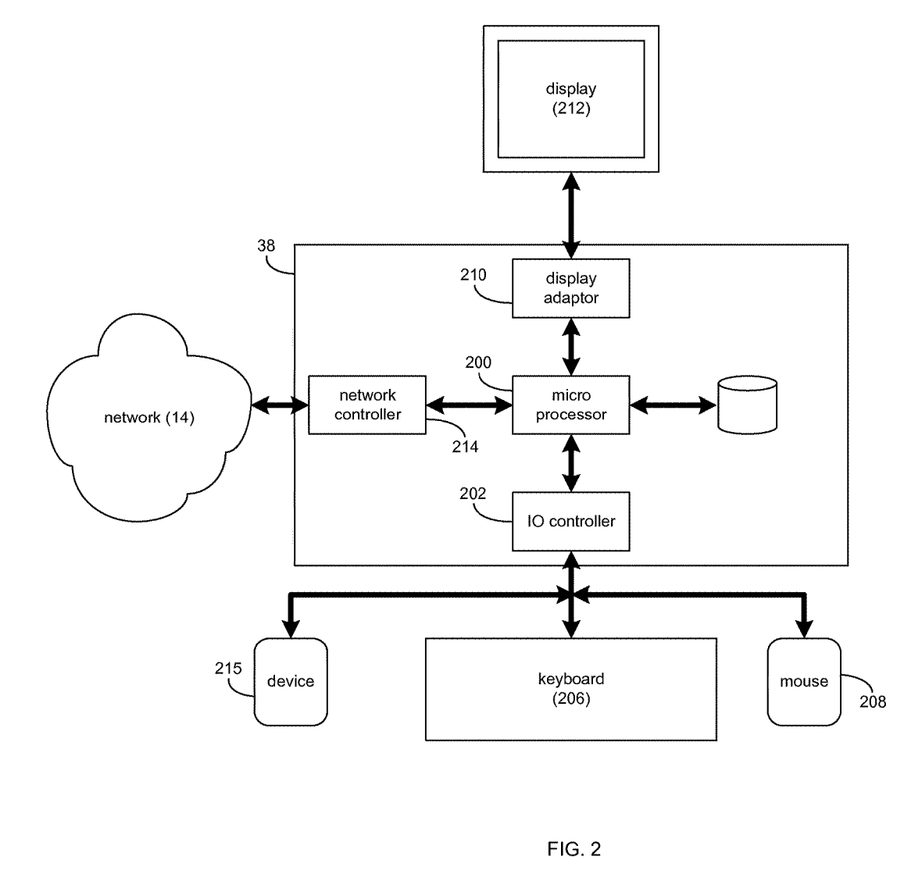
FIG. 2 is an example diagrammatic view of a client electronic device of FIG. 1 according to one or more example implementations of the disclosure.

Referring also to FIG. 2, there is shown a diagrammatic view of client electronic device 38. While client electronic device 38 is shown in this figure, this is for illustrative purposes only and is not intended to be a limitation of this disclosure, as other configurations are possible. For example, any computing device capable of executing, in whole or in part, index process 10 may be substituted for client electronic device 38 within FIG. 2, examples of which may include but are not limited to computer 12 and/or client electronic devices 40, 42, 44.

Client electronic device 38 may include a processor and/or microprocessor (e.g., microprocessor 200) configured to, e.g., process data and execute the above-noted code/instruction sets and subroutines. Microprocessor 200 may be coupled via a storage adaptor (not shown) to the above-noted storage device(s) (e.g., storage device 30). An I/O controller (e.g., I/O controller 202) may be configured to couple microprocessor 200 with various devices, such as keyboard 206, pointing/selecting device (e.g., mouse 208), custom device (e.g., device 215), USB ports (not shown), and printer ports (not shown). A display adaptor (e.g., display adaptor 210) may be configured to couple display 212 (e.g., CRT or LCD monitor(s)) with microprocessor 200, while network controller/adaptor 214 (e.g., an Ethernet adaptor) may be configured to couple microprocessor 200 to the above-noted network 14 (e.g., the Internet or a local area network).

Question Answering (QA) systems, such as the IBM Watson™ system, may include an application of advanced natural language processing, information retrieval, knowledge representation and reasoning, and machine learning technologies to the field of open domain question answering. The IBM Watson™ system may be built on IBM's DeepQA technology (or other compatible technology) used for hypothesis generation, massive evidence gathering, analysis, and scoring. The IBM Watson™ system may take an input question, analyze it, decompose the question into constituent parts, generate one or more hypothesis based on the decomposed question and results of a primary search of answer sources, perform hypothesis and evidence scoring based on a retrieval of evidence from evidence sources, perform synthesis of the one or more hypothesis, and based on trained models, perform a final merging and ranking to output an answer to the input question along with a confidence measure.

As noted above, in publishing, back-of-the-book indexing may still be a largely manual process. An index, e.g., of a cookbook, may generally be described as a reverse lookup including, e.g., pairs of terms, techniques, or ingredient names mapped to text segments that may contain important usages of those terms, typically specified via page number. Given space constraints within a printed book, it may be beneficial that only the most informative pairings be listed in the index. By contrast, online indexes need not be concerned with space constraints, and thus a virtually unlimited number of pairing entries may be maintained.

Creating back-of-the-book index for prose in (e.g., non-fiction) books may break the problem into 2 sub-problems: (1) For each single or multiword term, decide whether it is term-y enough to require index entries; (2) For each section within the book, decide whether any one term is central enough to a particular passage to merit listing the term/section association in the index. This calculation may be performed in a similar fashion to topicality detection (e.g., by judging whether the term is kept activated throughout the section).

For cookbooks, however, a concomitant technique may be needed to determine which terms (e.g., ingredient, dish names, preparation techniques, etc.) may be important enough to list in the index, and for those terms, how to compute their prominence or focus within particular recipe entries. The above-noted standard approaches may not work well on recipes, e.g., since each ingredient may typically be mentioned only one time within the preparation steps, so a calculation of discourse prominence may not be meaningful. As will be discussed in greater detail below, index process 10 may calculate emphasis using, e.g., text features specific to recipe format, and may use one or more features of QA application 20, such as IBM Chef Watson™ (or similar application) for features and indexing terms.

While the example implementations described throughout may be a cookbook with ingredients and recipes, it will be appreciated that the present disclosure may apply to any instruction text, such as for crafts, woodworking projects, or other genres, such as software user instructions. For example, the present disclosure may be used for any books (or other literature) that may include back-of-book indexes, and may be used for any books that may include a manifest or parts list and then step-by-step instructions. As such, the use of a cookbook (and associated portions of cookbooks) should be taken as example only and not to limit the scope of the disclosure.

The Index Process:

As discussed above and referring also at least to FIGS. 3-5, index process 10 may analyze 300 one or more existing book indexes to build a statistical model of term-to-text pairs. A document may be analyzed 302 by index process 10, wherein the document may include at least a portion of an instruction in a book. A term in the document may be identified 304 by index process 10. Whether the term is a candidate for an index of the book may be identified 306 by index process 10 based upon, at least in part, the statistical model of term-to-text pairs.

Figure 3:
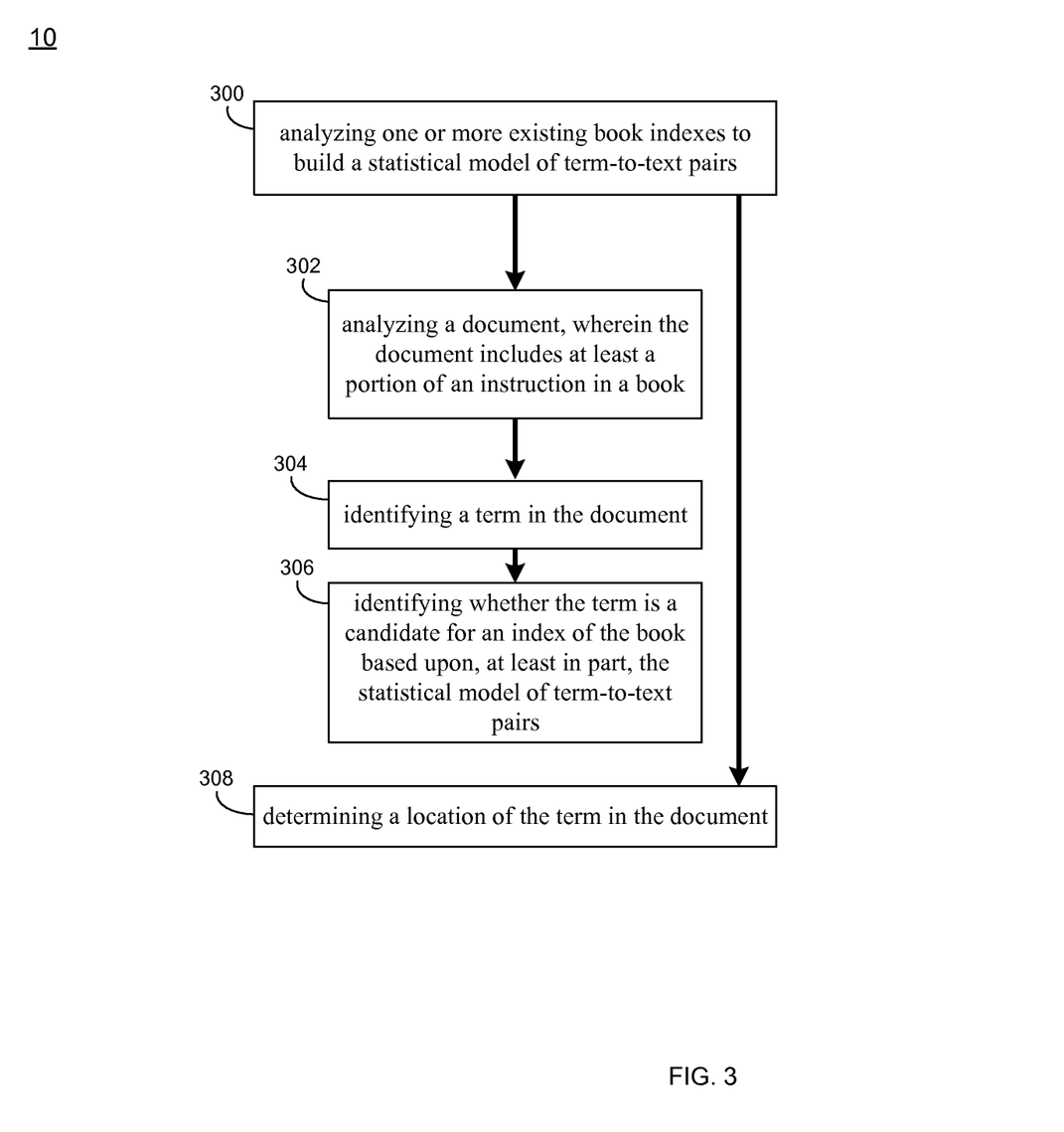
FIG. 3 is an example flowchart of the index process of FIG. 1 according to one or more example implementations of the disclosure.

As noted above, index process 10 may analyze 300 one or more existing book (e.g., cookbook) indexes to build a statistical model of term-to-text pairs. For example, index process 10 may analyze a corpus of existing cookbook indexes to build a statistical model of term→term-to-text pairs (e.g., term→term-to-recipe pair) from existing human-created indexes. In some implementations, the existing human-created indexes may be stored (e.g., via scanning, saved word processing document, etc.) in a data store, where their associated entries may be accessed by index process 10 for the analysis 300. In some implementations, these entries may be used as labeled training examples for the supervised machine learning model (e.g., of QA application 20 and/or index process 10). Each "document" may include a segment within a book (e.g., cookbook), such as a recipe, instructional segment, ingredients list, preamble, etc.

As will be discussed in greater detail below, the statistical model may include one or more positive examples and one or more negative examples. For example, statistical model created from the above-noted pairs may include positive and negative examples. For instance, in some implementations, a location of the term (e.g., ingredient) in the document may be determined 308 by index process 10. The one or more positive examples and the one or more negative examples may be determined based upon, at least in part, the location of the term (e.g., ingredient) in the document. For instance, and referring at least to FIG. 4, assume for example purposes only that a recipe (e.g., recipe 400) is for Caponata. In the example, recipe 400 may include a title (e.g., title 402), a preamble (e.g., preamble 404), an ingredients list (e.g., ingredients list 406), and an instructional segment (e.g., instructional segment 408). The title may include the name of the recipe (e.g., Caponata). The preamble may include a length of prose that introduces or describes the recipe, often stating what is unique about the recipe or otherwise motivating its inclusion in the cookbook. In this example, preamble 404 may indicate that celery, olives, and capers are emphasized ingredients of this recipe. The ingredients list may include a list of ingredients used in the recipe. The instruction segment may provide the procedure for making the recipe.

Figure 4:
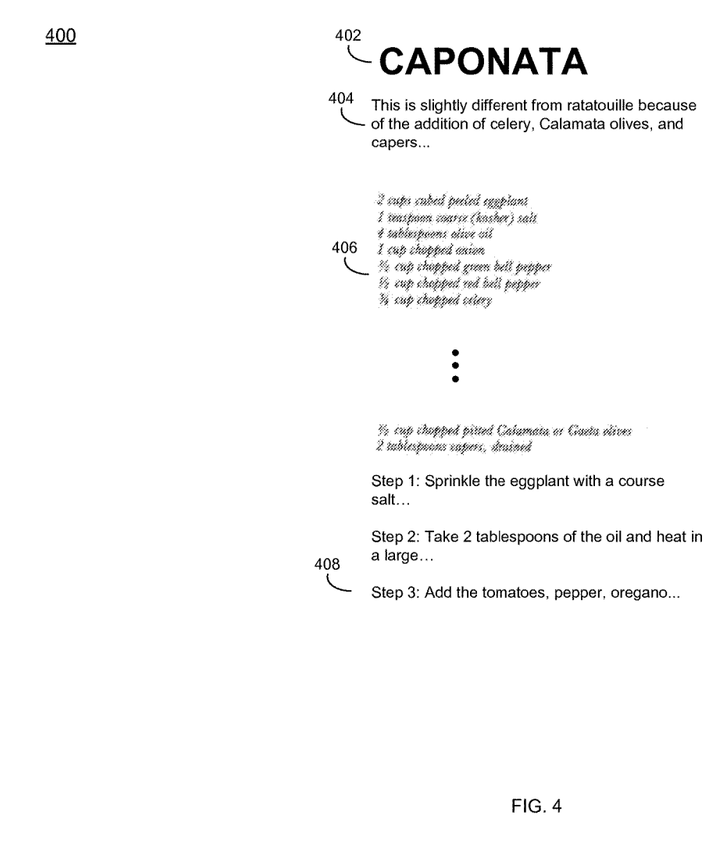
FIG. 4 is an example recipe for analysis by the index process of FIG. 1 according to one or more example implementations of the disclosure.
Figure 5:
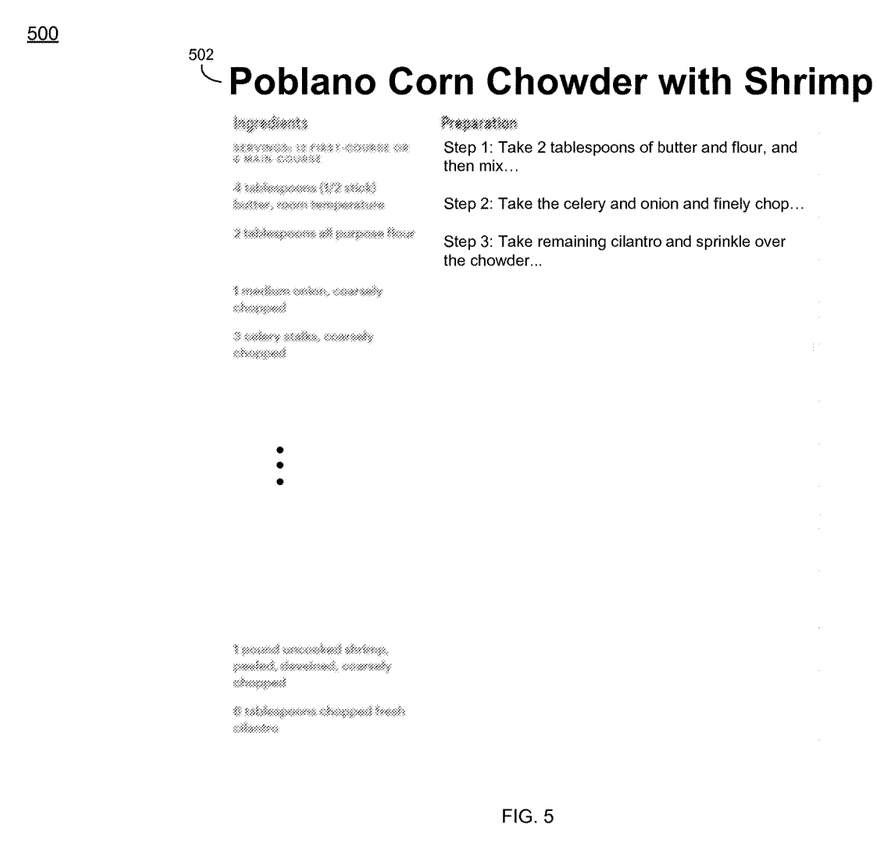
FIG. 5 is an example recipe for analysis by the index process of FIG. 1 according to one or more example implementations of the disclosure.

In some implementations, the location of the term (e.g., ingredient) in the document may include a title of the instruction (e.g., recipe), the location of the term (e.g., ingredient) in the document may include a preamble of the instruction (e.g., recipe), and/or the location of the term (e.g., ingredient) in the document may include a list of materials (e.g., an ingredients list) of the instruction (e.g., recipe). For instance, index process 10 may use deep NLP processing, such as predicate argument structure and text segmentation, to compute features for the index selection phase. In some implementations, other features that may be computed by index process 10 may include, e.g., cuisine style, dish type, dietary constraints from the recipe (e.g., such as vegan meals). In the example, index process 10 may thus also generate/propose terms/tags/labels and compare them to the above-noted human-produced index terms.

In some implementations, as noted above, the features used may be specific to recipes and the locations of ingredients. For example, in some implementations, index process 10 may use a parse-based feature. In the example, if the ingredient is mentioned in the preamble, syntactic features of its sentence context may be stored by index process 10. As noted above, preamble 404 may indicate that celery, olives, and capers are emphasized ingredients of this recipe. Further in the example, if the ingredient is mentioned in the recipe title, its position in the title may be stored (e.g., token number $0^{th}$, first, etc.). For instance, if title 402 were "Caponata: a delicious dish with Calamata olives and capers", Calamata olives may be token number 5/6, and capers may be 8. In the example, these may be stored by index process 10 as positive examples. In some implementations, a recipe title that is itself stored in the index, such as proper names, may be stored as positive examples by index process 10. For instance, some recipe titles, such as Pavlova, are proper names, and may be stored as positive examples by index process 10.

In some implementations, modifiers of the recipe titles (or section headers), for example, may similarly be analyzed 300. For instance, and referring at least to FIG. 5, a recipe (e.g., recipe 500) is shown. In the example, title 502 of recipe 500 is "Poblano Corn Chowder with Shrimp". In the example, index process 10 may analyze 300 the above-noted existing human-created indexes, which may determine that shrimp is an emphasized element of this corn chowder. For instance, after the analysis 300, index process 10 may determine that shrimp is not a common ingredient in corn chowder. As noted above, some recipe titles, such as Pavlova, are proper names and thus contain no emphasized ingredient terms for the index. Text processing such as term extraction and named entity recognition built with customized cooking lexicon (e.g., such as the one built for the IBM Chef Watson™) may be used for this feature extraction.

In some implementations, for an ingredient mentioned in the title or preamble that did not appear as an index entry (from the existing human-created indexes), index process 10 may store the same features as above, but label this as a negative example (e.g., non-index). For example, preamble 404 includes the ingredients celery, Calamata olives, and capers. Assume for example purposes only that the index for the cookbook that includes recipe 400 does not include an entry for celery, but does include an entry for Calamata olives and capers. In the example, index process 10 may label celery as a negative example. In the example, celery may be considered by index process 10 as a common ingredient. Common ingredients, such as celery, may not be listed for all recipes that include celery. For example, a substantial number of chowders may contain celery, so the celery does not necessarily merit mentioning. For example, a term "informativeness" score may be included in the statistics, in this case ingredient informativeness per dish type. For instance, the number of chowders with celery/the number of chowders. The machine learning of index process 10 may be trained to combine the features to calculate a confidence that this term should be in the index. On the other hand, a Pavlova recipe may feature eggs as a key ingredient, so there may likely be an index entry for eggs that may point to the Pavlova recipe in the existing human-created indexes. For instance, analytics performed by index process 10 of each recipe may include the relative volume of each ingredient, and mandatory ingredients for each kind of dish. For instance, Pavlova must contain eggs, just as a fettuccine dish must contain pasta. Similarly, a preamble for "Tahini cookies" may state that "The creamy sesame seed paste isn't just for hummus: It's the secret ingredient in these effortless confections." In the example, index process 10 may recognize that the ingredient "sesame seed" is being modified by "secret ingredient" (and/or may recognize that "secret ingredient" is emphasized via underlining or otherwise), thereby labeling sesame seed as a positive example. Further in the example, "Tahini" may also be labeled as a positive example as it is in the name of the recipe. In some implementations, the label for positive examples may be derived from whether the term is in the human-created index. The features such as emphasized ingredients may be used to learn the mapping from features to labels (positive/negative).

In some implementations, index process 10 may use recipe component features. For example, index process 10 may determine the amount of the ingredient as a proportion of the total recipe weight, the percent of total weight termd to this ingredient in this recipe, compared to the average for this dish type (e.g., chowder). This calculation of average usage in dish types may be supported by the large knowledge base of ingredient usage in recipes generated by, e.g., the IBM Chef Watson™ process (or similar process).

In some implementations, index process 10 may calculate the overall frequency of each ingredient type as an index term. For example, index process 10 may count the number of index terms that are a meat ingredient/the number of recipes containing meat, which may be used by index process 10 as a baseline frequency.

In some implementations, index process 10 may use a TF/IDF score for each ingredient. For instance, rare ingredients, such as truffles, may be assigned a higher weight by index process 10.

In some implementations, a document may be analyzed 302 by index process 10, wherein the document may include at least a portion of an instruction in a book (e.g., cookbook). For instance, a document may be analyzed 302 by index process 10, wherein the document may include at least a portion of a recipe in a cookbook. For example, assume an index for a new cookbook is being created. In the example, further assume one or more of the recipes is being analyzed 302 by index process 10 similar to the above discussion of creating the statistical model. Continuing with the example, index process 10 may identify 304 a term (e.g., an ingredient) in the document, and may identify 306 whether the term (e.g., ingredient) is a candidate for an index of the book (e.g., cookbook) based upon, at least in part, the statistical model of term-to-text pairs.

For example, index process 10 may iterate over each document (e.g., recipe) to identify 306 candidates for the index. In some implementations, candidates may be a pair: <key term+optional modifiers, segment reference>. Modifiers, if present, may be taken from the recipe type by index process 10. For example: Term=Eggs, Modifiers="in dessert", Ref=pointer to the Pavlova recipe.

In some implementations, within each segment, terms may be identified 306 as potential candidates in one or more ways. For instance, an ingredient in the recipe may be identified 304, and then identified 306 as a candidate if it is prominent in the "flavor profile" of the recipe. For example, chemical compounds and associated flavor descriptors (such as "woody") for each ingredient may be known or previously listed in a resource such as flavornet. Index process 10 may compute a vector of ranked flavor characteristics of each ingredient. Index process 10 may identify the prominence score (of the identified 304 ingredient), which combines average use and TF/IDF scores as noted above. In some implementations, index process 10 may compare the prominence score to the averages represented in the statistical model and propose this candidate if it is >=entries for this ingredient and dish type. A result may be a proposal of entries for ingredients used in much larger proportion than is typical for the dish type. For instance, garlic in aioli, eggplant in baba ganoush, etc. In some implementations, index process 10 may further weight terms within the recipe based on their frequency across documents.

In some implementations, using a classifier trained from the syntactic/lexical features from the preamble and title discussed above, an ingredient in the recipe may be identified 306 as a candidate if it is classified into the index rather than the non-index category as noted above. In some implementations, an instruction (e.g., recipe) title may be identified 306 as a candidate if it contains no common noun terms (e.g., a noun denoting a class of objects or a concept as opposed to a particular individual).

In some implementations, a so-called "backoff criteria" may be used. For instance, each document segment may be required to generate at least one index term as a candidate. However, if no candidate is identified 306 from the above criteria, index process 10 may propose the ingredient most often utilized in indexing, per the above-noted discussion of calculation the overall frequency of each ingredient type as an index term.

In some implementations, identifying 304 a term (e.g., ingredient) in the document may include index process 10 identifying 304 and/or adding inferred terms, such as those created by IBM Chef Watson™. For example, the term may include at least one of an ingredient, a cooking method, and a cooking style. For instance, index process 10 may take in consideration of the main elements of, e.g., i) Ingredients (e.g., vegetables, meats), ii) Cooking Method (e.g., braised), and/or iii) Cooking/Preparation Style (e.g., Jamaican, Master Chef, stove top to oven finish). For instance, the main elements need not be simply a keyword or ingredients list, but may still end up in the index. Examples of such an index may include, e.g.:

spicy dessert
45, 250
braised vegetables,
23, 54, 114,
Jamaican inspired,
67
Master Chef Inspired,
8, 14, 99
Stove top, to oven finish
17, 56, 83, 126

In the example, index process 10 may analyze 302 the language and deduce the cooking method, the set of main ingredients and theme for the meal to decide on a combination of "theme style" type of indices for certain pages in the cookbook. For instance, index process 10 may re-use the above-noted modeling terms (and/or those used in IBM Chef Watson™ or similar) to determine the main characteristic of the meal (e.g., nutrition conscious, vegetarian, novel, etc.). Index process 10 may also analyze the set of ingredients, the methods used for cooking, and may cross reference these against the domain of chef inputs (e.g., chefs noted as Subject Matter Experts in their field) to determine whether they are inspired from these type of cooking practices. Index process 10 may thus generally pull out some of the key identifiers, modeling and composition logic and create index categories by matching pages and recipes that may align and may be interesting for the purpose of that specific cookbook. As such, the use of identifying 304 an ingredient exclusively as a term should be taken as an example only and not to limit the scope of the disclosure.

In some implementations, index process 10 (e.g., via IBM Chef Watson™ or similar algorithms) may produce an in context index, e.g., by finding the most relevant key combinations that may be typical of a meal for a context based index that may cover, e.g., 2-3 primary ingredients and styles. For example, the statistical model and recipe algorithms may produce an index. Where the index context based content may be more representative of the type of recipes combinations index process 10 may produce, in that they may be a combination of, e.g., styles, main ingredient, and a dish. This may produce an index entry like "Persian Mushroom Sandwich", where the style is Persian, the main ingredient is mushroom and the dish is a sandwich. In some implementations, the index entry may be more general, such as "Mushroom Sandwich" in the index. As another example, "Jamaican Japanese Eggplant Stir Fry", where the style is Jamaican, main ingredients are beef and eggplant, may generate "Beef Eggplant Stir Fry" and another entry "Jamaican Beef Stir Fry". In some implementations, this may involve index process 10 identifying the content make up of the recipe for the ingredient with the most content (e.g., 2 lbs vs. ½ cup, etc.) and relevance (e.g., uses within dish, references in preparation, etc.), and then identifying the utensils and method used for cooking to have index process 10 generate the index using the same type of in context data and algorithms noted above.

While the disclosure provides examples of cookbooks, it will be appreciated that other types of literature may be used without departing from the scope of the disclosure. As such, the use of cookbooks should be taken as example only and not to otherwise limit the scope of the disclosure.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents of all means or step plus function elements that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to best explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
analyzing, by a computing device, one or more existing book indexes to build a statistical model of term-to-recipe pairs;
iteratively analyzing documents to identify candidates for an index,
wherein candidates may be a pair,
wherein each document includes at least a portion of an instruction or recipe in a book;
identifying a term in the document;
proposing terms, tags, or labels to be compared to identified terms;
wherein a term includes at least one of an ingredient, a cooking method, and a cooking style;
wherein analyzing a document includes determining a volume of each ingredient, and mandatory ingredients for each recipe;
determining the volume of the ingredient as a proportion of a total recipe weight to be used by the statistical model;
comparing the proportion of the total recipe weight of the ingredient to an average weight for a specific type of dish;
computing a vector of ranked flavor characteristics of each ingredient;
using the ranked flavor characteristic to identify candidates, and
identifying whether the term or ingredient is a candidate for an index based upon, at least in part, the statistical model of term-to-recipe pairs,
wherein the statistical model includes one or more positive examples and one or more negative examples based upon, at least in part, a location of the term in the document and presence of the term in the one or more existing book indexes.

2. The computer-implemented method of claim 1 further comprising determining a location of the term in the document.

3. The computer-implemented method of claim 1 wherein the location of the ingredient in the document includes a title of the instruction.

4. The computer-implemented method of claim 1 wherein the location of the term in the document includes a preamble of the instruction.

5. The computer-implemented method of claim 1 wherein the term includes at least one of an ingredient, a cooking method, and a cooking style.

6. A computer program product residing on a non-transitory computer readable storage medium having a plurality of instructions stored thereon which, when executed by a processor, cause the processor to perform operations comprising:
Analyzing one or more existing book indexes to build a statistical model of term-to-recipe pairs;
iteratively analyzing a documents to identify candidates for an index,
wherein candidates may be a pair,
wherein each document includes at least a portion of an instruction or recipe in a book;
identifying a term in the document;
proposing terms, tags, or labels to be compared to identified terms;
wherein a term includes at least one of an ingredient, a cooking method, and a cooking style;
wherein analyzing a document includes determining a volume of each ingredient, and mandatory ingredients for each recipe;
determining the volume of the ingredient as a proportion of a total recipe weight to be used by the statistical model;
comparing the proportion of the total recipe weight of the ingredient to an average weight for a specific type of dish;
computing a vector of ranked flavor characteristics of each ingredient;
using the ranked flavor characteristic to identify candidates, and identifying whether the term or ingredient is a candidate for an index based upon, at least in part, the statistical model of term-to-recipe pairs, wherein the statistical model includes one or more positive examples and one or more negative examples based upon, at least in part, a location of the term in the document and presence of the term in the one or more existing book indexes.

7. The computer program product of claim 6 further comprising determining a location of the term in the document.

8. The computer program product of claim 6 wherein the location of the ingredient in the document includes a title of the instruction.

9. The computer program product of claim 6 wherein the location of the term in the document includes a preamble of the instruction.

10. The computer program product of claim 6 wherein the term includes at least one of an ingredient, a cooking method, and a cooking style.

11. A computing system including a processor and a memory configured to perform operations comprising:
   analyzing one or more existing book indexes to build a statistical model of term-to-recipe pairs;
   iteratively analyzing a documents to identify candidates for an index,
      wherein candidates may be a pair,
      wherein each document includes at least a portion of an instruction or recipe in a book;
   identifying a term in the document;
   proposing terms, tags, or labels to be compared to identified terms;
   wherein a term includes at least one of an ingredient, a cooking method, and a cooking style;
   wherein analyzing a document includes determining a volume of each ingredient, and mandatory ingredients for each recipe;
   determining the volume of the ingredient as a proportion of a total recipe weight to be used by the statistical model;
   comparing the proportion of the total recipe weight of the ingredient to an average weight for a specific type of dish;
   computing a vector of ranked flavor characteristics of each ingredient;
   using the ranked flavor characteristic to identify candidates, and
   identifying whether the term or ingredient is a candidate for an index based upon, at least in part, the statistical model of term-to-recipe pairs,
   wherein the statistical model includes one or more positive examples and one or more negative examples based upon, at least in part, a location of the term in the document and presence of the term in the one or more existing book indexes.

12. The computing system of claim 11 further comprising determining a location of the term in the document.

13. The computing system of claim 11 wherein the location of the ingredient in the document includes a title of the instruction.

14. The computing system of claim 11 wherein the location of the term in the document includes a preamble of the instruction.

* * * * *